Dec. 6, 1960 A. H. NEAL 2,963,520
DILUENT PURIFICATION PROCESS
Filed Dec. 24, 1957
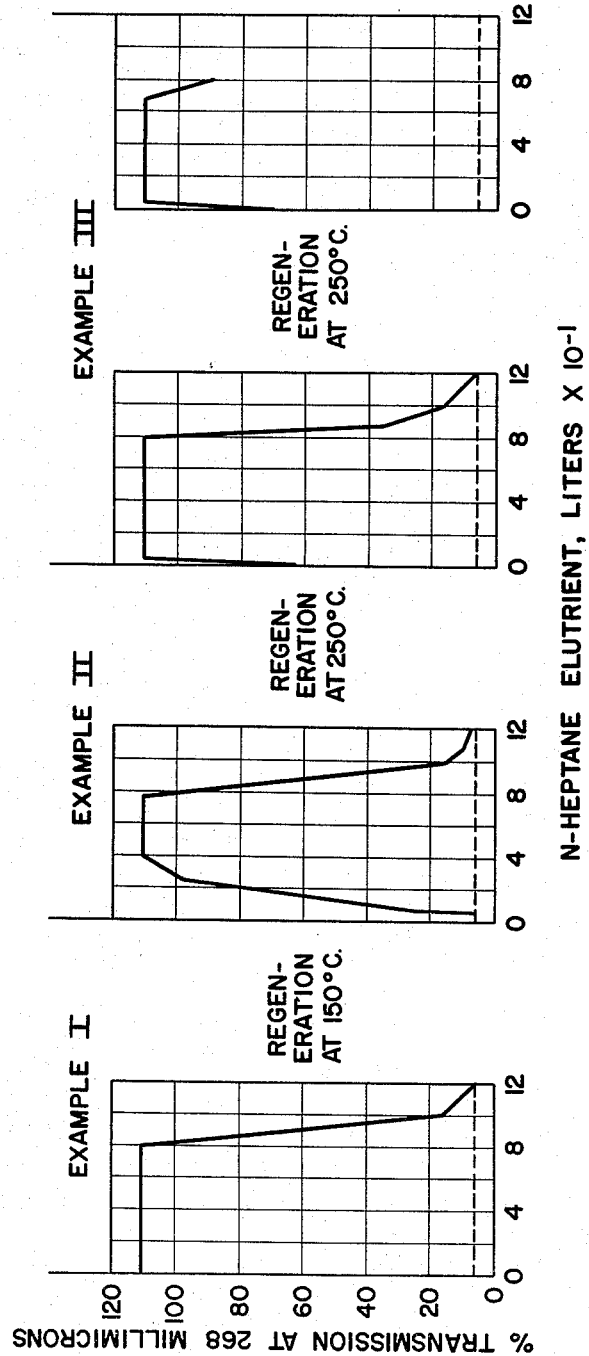
Arthur H. Neal  Inventor
By  L. Chason  Attorney _United States Patent Office_ 2,963,520
Patented Dec. 6, 1960

2,963,520

DILUENT PURIFICATION PROCESS

Arthur Homer Neal, Baton Rouge, La., assignor to Esso Research and Engineering Company, a corporation of Delaware Filed Dec. 24, 1957, Ser. No. 705,051

4 Claims. (Cl. 260—676)

This invention relates to a process for purifying hydrocarbon diluents. More particularly, the invention relates to a process for purifying saturated hydrocarbon diluents for use in the low pressure polymerization of alpha olefins.

The low pressure polymerization of alpha olefins with catalyst systems made up of reducible heavy transition metal compounds and a reducing metal containing compound to form high density isotactic, relatively linear products has been assuming ever increasing importance and is now well known, see e.g. Belgium patent, 533,362, "Chemical Engineering News," April 8, 1957, pages 12 through 16, and "Petroleum Refiner," December 1956, pages 191 through 196.

For purposes of convenience, the preparation of polyolefins prepared by the low pressure process is given below, although it should be understood that this process does not constitute a part of the invention.

The alpha olefins utilized in the low pressure polymerization process include ethylene, propylene, butene-1, heptene-1, dodecene-1 and the like with ethylene and propylene preferred. The catalysts used in the polymerization reaction are solid insoluble reaction products obtained by reducing a reducible heavy transition metal compound, the metal component of which is taken from groups IVB, VIB or VIII or manganese with a reducing organometallic compound of an alkali, alkaline earth, rare earth, aluminum or zinc metal compound. The catalyst can also be prepared by reducing an appropriate metal compound with either metallic aluminum, or a mixture of aluminum and titanium, or the like. The preferred catalyst of this type is usually prepared by reducing one mole of a titanium tetrahalide, preferably tetrachloride, to the corresponding trivalent titanium halide with about 0.2 to 6 moles of either aluminum triethyl or aluminum triisobutyl or other aluminum alkyl compound of the formula RR′AlX wherein, R, R′ and X preferably are alkyl groups having from 2 to 8 carbon atoms, although X can be hydrogen or halogen, preferably chlorine. The reduction is best carried out by dissolving each of the two catalyst components in an inert solvent, preferably a $C_3$ to $C_{18}$ paraffin hydrocarbon such as isopentane or n-heptane, and mixing the two solutions in the proper proportions at a temperature between 0° and 150° C. and in the absence of moisture, oxygen and sulfur impurities. The resulting precipitate in conjunction with some free aluminum alkyl compound is generally considered to constitute the actual active polymerization catalyst. Accordingly, the catalyst preparation is preferably carried out by using only about 0.3 to 0.8 mole of the aluminum alkyl compound per mole of titanium chloride, followed by the addition of the supplemental amount of the aluminum alkyl compound to the polymerization zone to raise the Al/Ti mole ratio to a value between about 1:1 and 3:1.

The alpha olefins are then contacted with the resulting catalyst in the presence of the same or different inert hydrocarbon solvent such as isopentane, n-heptane, xylene, and the like. The polymerization is conveniently carried out at temperatures of about 0 to 100° C. and pressures in the range of about 0 to 500 p.s.i.g., preferably 0 to 50 p.s.i.g. The catalyst concentration in the polymerization zone is preferably in the range of about 0.1 to 0.5%, based on the weight of total liquid present. The polymer product concentration in the polymerization zone is preferably maintained between about 2 to 25%, based on the weight of total contents, to allow easy handling of the polymerized mixture. The proper polymer concentration can be obtained either by having a sufficient quantity of the inert diluent present or by stopping the polymerization reaction before 100% conversion has occurred. When the desired degree of polymerization has been obtained, a $C_1$ to $C_8$ alkanol such as isopropyl alcohol or n-butyl alcohol, desirably in combination with a chelating agent such as acetyl acetone, is normally added to the reaction mixture to dissolve and deactivate the catalyst and to precipitate the polymer product from solution. After filtration, the solid polymer can be further washed with alcohol or an acid such as hydrochloric acid, dried, compacted and packaged.

The term "low pressure polymerization" is understood to mean the polymerization of alpha olefins in accordance with the above process.

It is a problem with the above reaction that when inert saturated aliphatic hydrocarbon diluents are utilized for the polymerization reaction impurities are often present in these diluents which contaminate the polymerization catalysts and reduce their efficiency and useful life.

It has now been discovered that a practical process for purifying these saturated hydrocarbon diluents containing catalyst contaminants comprises passing the contaminated diluent through a silica gel bed while continuously monitoring one or more of the aromatic, olefinic, and sulfur compounds in the resulting elutrient to determine when the gel is spent, regenerating the spent silica gel by treating it with the alpha olefin being polymerized and repeating the above process. Silica gel is an extremely effective purifying agent for the removal of catalyst contaminants from the saturated hydrocarbon diluents used in the low pressure polymerization process.

In accordance with the present invention, it can be determined from the continuous monitoring of one or more of the aromatic, olefinic, and sulfur compounds in the elutrient from the silica gel bed when regeneration of the silica gel is necessary. In particular, it has been found that when the hydrocarbon diluent contains 0.1 wt. percent or more of aromatic components, the silica gel should be regenerated. Also, with respect to monitoring the olefin concentration, it has been found that when the hydrocarbon elutrient has a bromine index of 10 or above, the silica gel should be regenerated.

The monitoring device for determining the concentration of aromatic compounds in the elutrient is preferably a device adapted to determine the ultraviolet absorption of the elutrient at a wavelength of about 268 millimicrons. Such a device is the Beckman model DUR recording ultraviolet spectrophotometer, see e.g. Campbell and Godin, Ind. Eng. Chem. 46, 1413 (1954). Additionally, however, other monitoring methods can be used such as refractive index, gas chromatography and infrared measurements.

Additionally or alternatively, the olefin and/or sulfur compound concentration in the hydrocarbon elutrient can be continuously monitored by a device such as an automatic coulometric titration apparatus. Other devices such as the Foxboro Dynolog capacitance instrument that are adapted to continuously monitor the olefin and/or sulfur compound concentration in the elutrient can also be used.

The hydrocarbon diluents utilized in the low pressure polymerization of alpha olefins and purified by the present process are saturated aliphatic hydrocarbons containing from about 5 to 16 carbon atoms per molecule. Particularly preferred are hexane, n-heptane, white oil having a kinematic viscosity of about 1.85 at 100° F., and the mixture of $C_{11}$–$C_{16}$ hydrocarbons produced by the alkylation of olefins with isoparaffins and commonly referred to as alkylate bottoms.

The quantity of silica gel employed per unit weight of diluent is a function of many variables including percolation rate, temperature, column design, and the like, but in general the diluent to silica gel ratio used is from 10:1 to 100:1. The rate of passage of diluent through the silica gel and the temperature at which the diluent is passed through the silica gel are not critical. In general, however, the temperature is in the range of 65 to 150° F. A desirable rate will depend of course on the size of the column, the size and the surface area of the silica gel particles, the length of the column, and the like, and can easily be determined by routine experimentation for the particular column employed.

Referring now to the regeneration of the silica gel, it is to be noted that spent silica gels from other processes are generally regenerated by the use of relatively inert, poorly adsorbed substances, such as nitrogen and propane, or by strongly adsorbed substances such as steam, alcohols, and the like. However, for regenerating the spent silica gel used in the present process, the use of poorly adsorbed substances is not practical since the regeneration process using them is very slow and inefficient. Moreover, the strongly adsorbed materials cannot be used since they are themselves low pressure polymerization catalyst contaminants. It has now been found that the spent silica gel can be rapidly and efficiently regenerated by the use of an additional amount of the alpha olefin used in the polymerization process.

The regeneration of the silica gel is carried out by discontinuing the passage of contaminated hydrocarbon diluent through the silica gel and thereafter passing the appropriate alpha olefin through the silica gel to displace the adsorbed impurities thereon. The regeneration can be carried out by the use of either gaseous or liquid alpha olefin. The temperature of regeneration is in the range of 15° to 400° C., preferably 25° to 250° C. The pressures which are employed are in the range of 0 to 500 p.s.i.g., preferably 0 to 200 p.s.i.g. The rate of passing the alpha olefin through the spent silica gel and the length of time this should be carried out will depend on various factors such as the size of the column, the temperature of regeneration, the size and surface area of the silica gel particles, the quantities and types of contaminants thereon, and the like. Proper regeneration conditions for a particular spent silica gel system can be determined easily by routine experimentation.

The figure is the percent ultraviolet transmission at 268 millimicrons plotted against the number of liters of n-heptane elutrient obtained for several of the examples.

The invention will be understood more clearly from the following examples. It is to be noted that where given the molecular weights of the polymer products were calculated from their intrinsic viscosities using the Harris correlation (J. Polymer. Sci. 8, 36 (1952)).

In Examples I through III a small amount of xylene was added to n-heptane as an example of a strongly adsorbed aromatic impurity which is difficult to desorb from silica gel.

EXAMPLE I n-Heptane containing 0.05 wt. percent xylene and having an ultraviolet transmission of about 3% at 268 millimicrons compared with commercially pure n-heptane as a standard of 100% transmission at this wavelength was passed through a 1 inch by 10 inch column packed with activated silica gel of 80 to 200 mesh until the ultraviolet adsorption of the elutrient using a Beckman model DU spectrophotometer and 1 cm. cells was 3%, i.e. the same as the starting diluent showing the presence of an aromatic content of about 0.05 wt. percent in the elutrient. This occurred after about 1.2 liters of the n-heptane solution passed through the silica gel column. The column was then allowed to drain and thereafter propylene gas was passed through the column at atmospheric pressure with a feed rate of 2 to 3 v./v./hr. and at a temperature of 150° C. 45 liters of dried pure propylene gas were arbitrarily chosen for use in generating the silica gel. This quantity of propylene proved to be insufficient for complete regeneration of the silica gel at 150° C.

EXAMPLE II

The entire process of Example I was repeated using the partially regenerated silica gel from Example I except that in the regeneration step a temperature of 250° C. was utilized for propylene regeneration of the silica gel column. At this temperature, the 45 liters of propylene used was sufficient to regenerate the silica gel completely.

EXAMPLE III

The entire process of Example II was repeated again using the regenerated silica gel of Example II. The silica gel again was completely regenerated as determined by passing additional xylene-contaminated n-heptane through the column and measuring the ultraviolet transmission of the elutrient. It is to be noted that no polymerization of the propylene on the silica gel occurred under the regeneration conditions used.

The figure shows the quantity of xylene contaminated n-heptane purified by the silica gel column plotted against the percent transmission of the elutrient at a wavelength of 268 millimicrons for Examples I through III. The regenerations of the silica gel for Examples I through III are shown in the figure as breaks in the elutrient transmission curves.

It can be seen from the figure that complete regeneration of silica gel contaminated with xylene can be carried out by treating the gel with an alpha olefin monomer used in the low pressure polymerization process. Additionally, the regeneration of the silica gel is substantially complete as shown by the xylene removal ability of the regenerated gel regenerated by the process of Examples II and III when compared with that of the fresh silica gel used in Example I. In particular, silica gel regenerated by the process of Examples II and III purified about 0.8 liter of xylene-contaminated n-heptane which is the same amount as was purified by the fresh silica gel of Example I.

EXAMPLE IV

A diluent comprising a mixture of $C_{11}$ to $C_{16}$ hydrocarbons boiling in the range of 350 to 400° F. and commonly known as alkylate bottoms was found by analysis to contain 0.04 wt. percent olefins and 0.03 wt. percent aromatic compounds. A portion of this diluent was passed at room temperature through a 2" x 5' column packed with 2900 cc. of 80–200 mesh silica gel (previously activated at 600° F.) at an average rate of 0.04 v./v./hr. A pressure of 3 to 4 p.s.i.g. was maintained in the top of the column. The diluent before passage through the column had an ultraviolet transmission of 21.5% at 268 millimicrons compared to 100% transmission for pure isooctane. The elutrient from the column had a transmission of 108%. The diluent was passed through the column until a total of 33.4 liters had been collected which corresponds to 11.5 volumes of elutrient per volume of silica gel. The last portion of this elutrient to pass through the column had an ultraviolet transmission of 102%. When additional diluent was passed through the column, the transmission of the resulting elutrient dropped rapidly until at a total throughput of approximately 34 liters the transmission of the elutrient was identical to that of the starting diluent.

The purified diluent prepared above was used for the polymerization of ethylene and propylene. When ethylene was used as the monomer, the ethylene was passed at atmospheric pressure and 150° F. into 600 cc. of the purified diluent containing therein an $AlEt_3 \cdot TiCl_4$ catalyst prepared by mixing together 0.12 gram of AlEt$_3$ and 0.51 gram of TiCl$_4$. When propylene was used as the monomer, the propylene was passed at atmospheric pressure and a temperature of 148–150° F. into the purified diluent-containing a violet TiCl$_3$.AlEt$_3$ catalyst having an Al/Ti ratio of 2.0 and a catalyst concentration of 1.8 grams per liter. The reaction rates and the molecular weight of polymer obtained for the silica gel purified diluent are given in Table I. The reaction rate and molecular weight of polymerization reactions carried out with either pure n-heptane or with unpurified alkylate bottoms as the diluent using the same conditions as above are also given in Table I for comparison purposes.

*Table I*

| Diluent | Monomer | Reaction Rate, W./Hr./W. | Molecular Wt. ×10$^{-3}$ |
|---|---|---|---|
| Pure n-Heptane | ethylene | 59 | 43 |
| Silica gel purified alkylate bottoms | do | 68 | 44 |
| Unpurified alkylate bottoms | do | 38 | 62 |
| Pure n-Heptane | propylene | 42 | 166 |
| Purified alkylate bottoms | do | 44 | 106 |

Additional unpurified alkylate bottoms diluent is treated using the above column which is regenerated by allowing the column to drain and passing dried pure propylene gas or ethylene gas depending on which was used in the polymerization reaction through the column at 0 to 10 p.s.i.g. at 200 to 250° C. and at a rate of 2 to 5 v./v./hr. The column is then cooled and additional unpurified alkylate bottoms again passed through the column until from 30 to 35 liters of purified diluent are obtained. The purified diluent is then used to polymerize ethylene using the ethylene polymerization conditions described above. The reaction rates are found to be of the order of 55 to 65 w./hr./w.

EXAMPLE V

Flit base, which is an acid treated commercial white oil, was purified by passing it through a silica gel column identical to the one described in Example IV and under the same conditions used in Example IV. A volume of purified flit base was obtained equivalent to 3.8 times the volume of silica gel in the column. Ethylene was then polymerized using this purified diluent containing 0.15 wt. percent of a TiCl$_4$.AlEt$_3$ catalyst having an AlEt$_3$/TiCl$_4$ ratio of 2.0. The polymerization was carried out at 150° F. and atmospheric pressure. Untreated flit base and pure n-heptane were also used as diluents for ethylene polymerization reactions using the above conditions for comparison purposes. The purified flit base was also used for the polymerization of propylene at 158° F. and atmospheric pressure using a brown pretreated TiCl$_3$.AlEt$_3$ catalyst having an Al/Ti ratio of 2.0 and a catalyst concentration of 1.8 grams per liter. The reaction rate and molecular weight of the polypropylene obtained is given in Table II. Propylene polymerization reactions were carried out in the above manner with pure n-heptane as a diluent and the results obtained therewith are also given in Table II.

*Table II*

| Diluent | Monomer | Reaction Rate, W./Hr./W. | Molecular Wt. ×10$^{-3}$ |
|---|---|---|---|
| Pure n-heptane | ethylene | 60 | 39 |
| Purified flit base | do | 68 | 40 |
| Unpurified flit base | do | 40 | 100 |
| Pure n-heptane | propylene | 46 | 115 |
| Purified flit base | do | 42 | 90 |

The silica gel is then regenerated according to the procedure of Example IV. Additional unpurified flit base is then passed through the regenerated silica gel to produce 3.5 to 4.0 volumes of purified flit base per volume of silica gel. This purified flit base is then used in the polymerization of ethylene and results in reaction rates and polyethylene molecular weights similar to that obtained using the flit base first purified.

It can be seen from Examples IV and V that silica gel contaminated from contaminants in commercial diluents, such as commercial white oil and alkylate bottoms, which are used as diluents in the low pressure alpha olefin polymerization process can be successfully purified by treatment with the monomer being polymerized.

The process described herein for purifying saturated hydrocarbon diluents can be modified to purify aromatic diluents by passing the aromatic diluents through an alumina bed and regenerating the bed with the monomer being polymerized.

It is to be understood that this invention is not limited to the specific examples which have been presented for illustration purposes only. Additionally, modifications within the inventive concept can be made by those skilled in the art without departing from the scope and spirit of the invention.

What is claimed is:

1. The process for purifying saturated hydrocarbon diluents used in the low pressure polymerization of alpha olefins selected from the group consisting of ethylene and propylene and which contain contaminants which contaminate catalysts, formed by admixing a titanium halide and an aluminum alkyl, used therein comprising passing the contaminated diluent through a silica gel bed to purify the diluent, continuously monitoring the purified diluent to determine the concentration of at least one contaminant selected from the group consisting of aromatic compounds, sulfur compounds, and olefinic compounds present therein to determine when the gel is spent, treating the spent silica gel with the alpha olefin being polymerized at a temperature in the range of 25 to 250° C. and a pressure in the range of 0 to 200 p.s.i.g., and repeating the above process.

2. The process of claim 1 wherein the hydrocarbon diluent is selected from the group consisting of hexane, n-heptane, white oil, and a mixture of C$_{11}$–C$_{16}$ hydrocarbons.

3. The process of claim 1 wherein the monitoring devices for the olefinic and sulfur compound contaminants is an automatic coulometric titration apparatus and the monitoring device for the aromatic contaminant is adapted to produce ultraviolet light and adapted to measure ultraviolet adsorption at about 268 millimicrons.

4. The process for purifying saturated hydrocarbon diluents which are used in the low pressure polymerization of alpha olefins selected from the group consisting of ethylene and propylene and which contain contaminants which contaminate the polymerization catalysts, formed by admixing a titanium halide and an aluminum alkyl, used therein comprising passing the contaminated diluent through a silica gel bed to purify the diluent, continuously monitoring the aromatic content of the diluent to determine when the gel is spent, treating the spent gel with the alpha olefin being polymerized at a temperature in the range of 25 to 250° C. and a pressure in the range of 0 to 200 p.s.i.g., and repeating the above process.

References Cited in the file of this patent

UNITED STATES PATENTS

| | | |
|---|---|---|
| 2,594,557 | Hirschler | Apr. 29, 1952 |
| 2,773,803 | Fear et al. | Dec. 11, 1956 |
| 2,806,144 | Berger et al. | Sept. 10, 1957 |
| 2,813,010 | Hutchins | Nov. 12, 1957 |
| 2,818,455 | Ballard et al. | Dec. 31, 1957 |
| 2,862,917 | Anderson et al. | Dec. 2, 1958 |
| 2,866,835 | Kimberlin et al. | Dec. 30, 1958 |